United States Patent [19]

Carroll et al.

[11] 4,438,960
[45] Mar. 27, 1984

[54] CLAMPING & SEALING SYSTEM FOR FLANGED DUCTS

[75] Inventors: Glenn G. Carroll; Joseph C. Frank, both of Port Hope, Mich.

[73] Assignee: Alcolite Products Corp., Mt. Clemens, Mich.

[21] Appl. No.: 399,023

[22] Filed: Jul. 16, 1982

[51] Int. Cl.³ ............................................. F16L 23/00
[52] U.S. Cl. .................................... 285/367; 285/408; 285/DIG. 22
[58] Field of Search ............... 285/367, 365, 407, 408, 285/409, 410, DIG. 22

[56] References Cited

U.S. PATENT DOCUMENTS

| | | | |
|---|---|---|---|
| 2,541,205 | 2/1951 | Christophersen | 285/367 X |
| 2,908,744 | 10/1959 | Bollmeier | 285/DIG. 22 X |
| 3,042,430 | 7/1962 | Guy | 285/365 |
| 3,828,403 | 8/1974 | Perrin et al. | 285/365 X |
| 4,202,568 | 5/1980 | Strom | 285/365 X |
| 4,326,737 | 4/1982 | Lehmann | 285/365 X |
| 4,341,406 | 7/1982 | Abbes et al. | 285/408 |

FOREIGN PATENT DOCUMENTS

| | | | |
|---|---|---|---|
| 870347 | 3/1953 | Fed. Rep. of Germany | 285/367 |
| 2117570 | 7/1972 | France | 285/365 |

Primary Examiner—Thomas F. Callaghan
Attorney, Agent, or Firm—Cullen, Sloman, Cantor, Grauer, Scott & Rutherford

[57] ABSTRACT

A plastic clamping ring for securing and sealing the joint between adjoining peripherally flanged ducts has a generally V-shaped cross-section provided with a molded in place or bonded seal which engages the flange rims. A latching feature permits the ends of the clamp to be temporarily latched in position to frictionally limit, without preventing, adjustment of the relative angular position of the two adjoining coaxial ducts prior to application of the full clamping force.

4 Claims, 7 Drawing Figures

CLAMPING & SEALING SYSTEM FOR FLANGED DUCTS

BACKGROUND & SUMMARY OF INVENTION

The present invention involves the art of connecting and clamping together adjoining lengths of flanged pipes, tubes and ducts, hereafter generally referred to as "ducts". Such connections are commonly employed in a variety of hydraulic and pneumatic systems. The system disclosed herein is particularly well suited for applications where an assured seal is essential, notwithstanding large pressure differentials between the duct interior and exterior, and where preliminary adjustment of the relative angular position of the adjoining ducts about their common axis is desired, even after an initial connection of the ducts.

Duct ends have in the past been commonly formed with peripheral flanges having conical surfaces which taper outwardly toward the end of the duct. O-rings or gaskets have been employed between the abutting flanges of the ducts to be joined, so that when a V-type retainer ring is tightened around the joined ducts, the flanges are wedged toward each other to compress the seal.

An example of this type of prior art connection is the V-retainer coupling manufactured by Voss Industries, Inc. of Cleveland, Ohio. This coupling generally consists of a ring having a V-shaped cross-section, with the legs of the V engaging the conical surfaces of the duct flanges, the V-ring being supplemented by an additional flat band secured to the outer circumference of the ring, that is, to the base of the V-shaped portion. A threaded connection at the ends of the coupling draws the ends together to establish the clamping force. The coupling is fabricated of metal, and the side walls or legs of the V-shaped portion must therefore be interrupted at one or more points around the perimeter to permit the ring to be spread apart during assembly over the duct flanges without buckling or tearing of these legs. This interruption in the continuity of the clamping ring reduces the effectiveness of the clamping pressure against the sealing means in the area of the gap.

It is an object of the present invention to provide an improved clamping system for flanged ducts which provides an effective and continuous seal around the full periphery of the duct joint, and which provides multiple stages or lines of sealing engagement. It is a further object to provide such a clamping system which can be initially positioned over the adjoining ducts to maintain the ducts in their joined condition prior to final clamping while permitting the ducts to be rotated about their common axis to a desired angular position.

The above objects have been accomplished by the present invention by the creation of a clamping ring which may be injection molded from a plastic material such as polyurethane, pheyelene oxide, polyphenylene sulfide, or polyterafluoroethylene (such as "Halon", "Teflon" or "Fluon"). The clamping ring is formed with a relatively soft compressible seal which is either molded in place or bonded to the full inner perimeter of the ring and positioned to engage the outer rim of the duct flanges and, in an alternative embodiment, to additionally engage the conical surfaces of the duct flanges.

One end of the clamping ring is additionally provided with an undercut recess which receives a projection from the other end to establish a temporary latching position. The seal is turned radially outwardly in such recess and is positioned to be abutted and compressed by the latching projection, to establish a complete uninterrupted seal around the full periphery of the joint.

DETAILED DESCRIPTION OF THE INVENTION

Figure 1:
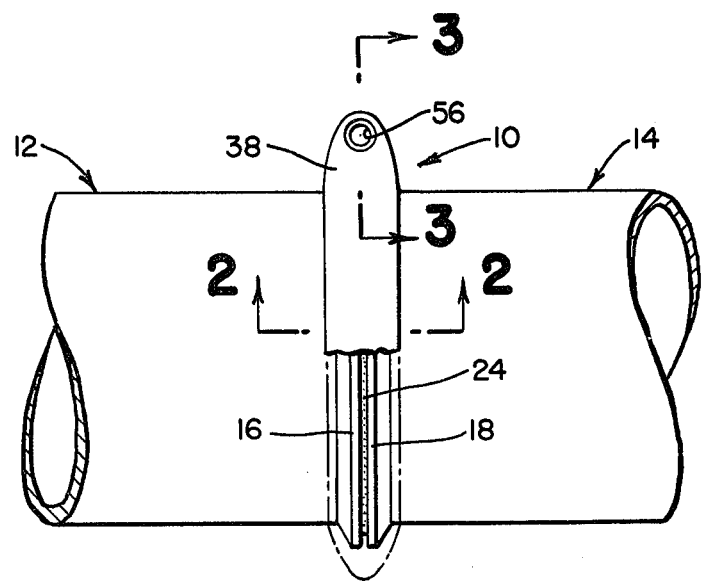
FIG. 1 is a fragmentary elevational view of two assembled flanged ducts, with a portion of the clamping ring broken away to reveal the flanges.
Figure 2:
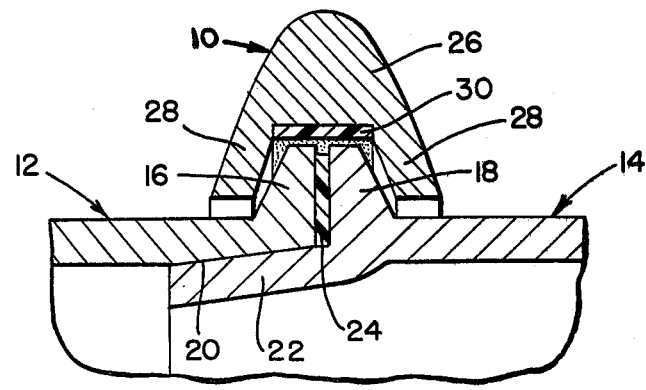
FIG. 2 is an enlarged cross-sectional view of the duct flanges and clamping ring, viewed in the direction of arrows 2—2 of FIG. 1.

Referring to FIGS. 1 and 2 of the drawings, clamping ring 10 is shown in assembled position over two adjoining ducts 12 and 14 having peripheral flanges 16, 18 respectively. In the illustrated ducts, the end configuration includes a tapered recess 20 on the end of duct 12 which receives a similarly tapered extension 22 on the end of duct 14. This optional feature provides an additional line of sealing contact, but is not essential to the claimed features of the present invention. Additionally, a seal 24 is shown between the abutting flanges, which seal may be molded in place on, or bonded to, the flange of one of the ducts. Seal 24 is also an optional feature, to provide an additional line of sealing engagement, which is not essential to the novel clamping ring of the present invention.

Figure 3:
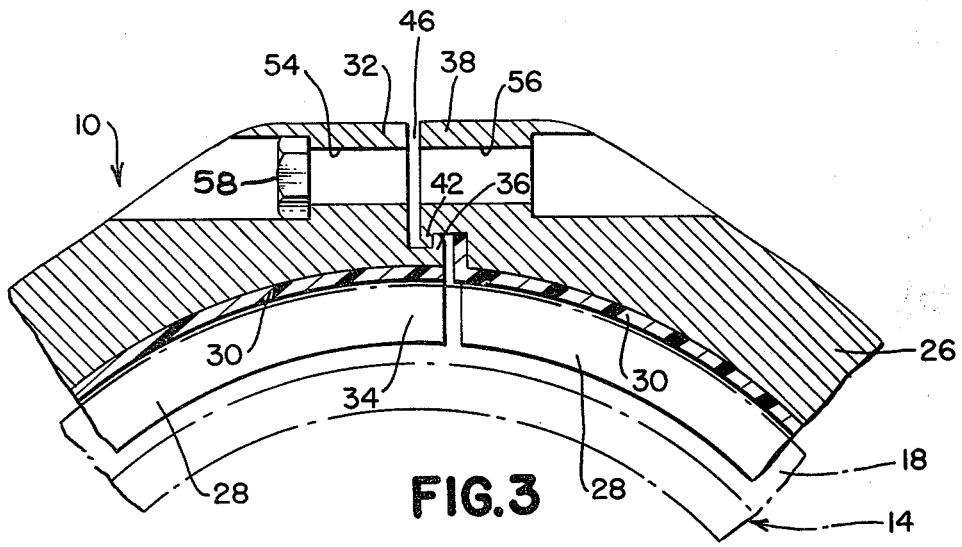
FIG. 3 is an enlarged cross-sectional view of the ends of the clamping ring in their latched position, viewed in the direction of arrows 3—3 of FIG. 1.

As best shown in FIGS. 2 and 3, clamping ring 10 is generally in the form of an inverted V, including a base portion 26 and two legs 28. A peripheral seal 30 is located in the root or groove portion of ring 10, and extends around the full perimeter thereof.

One end 32 of ring 10 is formed with an extension 334 (see FIGS. 3–6) having a radially outwardly projecting lip 36. The other end 38 of clamping ring 10 has a similarly shaped recess 40 to receive extension 34. Recess 40 is formed with an undercut behind latching lip 42, so that a latching function is established when lip 36 is positioned behind lip 42 as shown in FIGS. 3 and 6.

Extension 34 also has a seal engagement face 44 which is positioned to abut an outwardly turned portion of seal 30 in recess 40 of ring end 38, as will be described hereafter.

A clearance gap 46 (see FIG. 6) is maintained between the opposed faces of ring ends 32 and 38, to assure that the two ends do not prematurely "bottom out" prior to the desired compression of the seals.

Chamfers 48 and 50 are provided on the leading edge of latching lip 36 and 42 for a purpose to be explained below.

Clamping ring 10 is preferably formed by injection molding of a thermoplastic material having physical properties which permit it to resiliently flex in a radial direction as required for assembly over the flanges, while having sufficient tensile strength to resist creep resulting from high clamping forces over an extended period of time. As will be appreciated by those skilled in the art, the specific environment and desired physical properties of a particular application will dictate the final selection of ingredients. Among suitable materials are polyurethane, pheyelene oxide, polyphenylene sulfide and polyterafluoroethylene.

Seal 30 may be injection molded onto the already formed clamping ring 10, or alternatively, may be adhesively or solvent bonded to the ring after separate fabrication of these two components, depending upon the desired physical properties for the intended environment. Suitable materials include those previously listed as appropriate for the clamping ring, plus butyl rubber. As will be appreciated by those skilled in the art, the particular formulation of material for the seal will depend upon the physical properties required in the intended environment.

Figure 4:
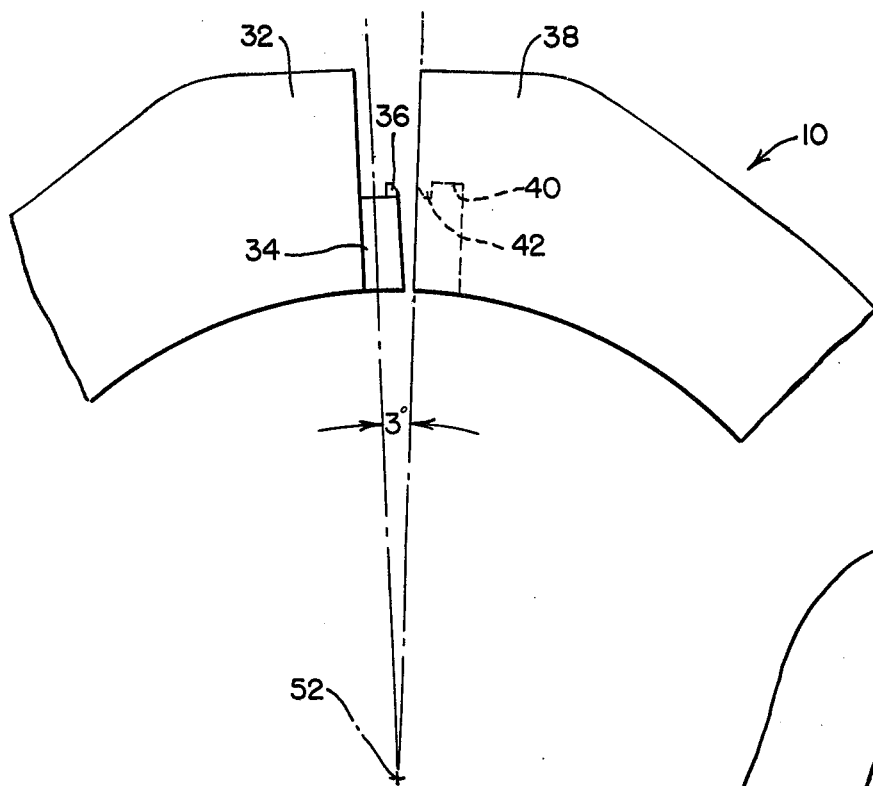
FIG. 4 is a fragmentary elevational view, similar to FIG. 3, but showing the relationship of the ends of the clamping ring in their as-molded position.

Referring now to FIG. 4, there is fragmentarily shown the end portions of the clamping ring in their as molded position. By way of example, for an approximately six inch diameter duct, the mold for the ring would be formed so that the end faces of the left and right halves of the ring (as viewed in FIG. 4) are inclined at a three degree angle relative to each other, as measured from arc center 52. This particular configuration permits the ring to be resiliently flexed apart for assembly over the duct flanges, and also to be resiliently latched together in a position (such as shown in FIGS. 3 and 6) in which the resliency will tend to retain the clamp in its latched position.

Figure 5:
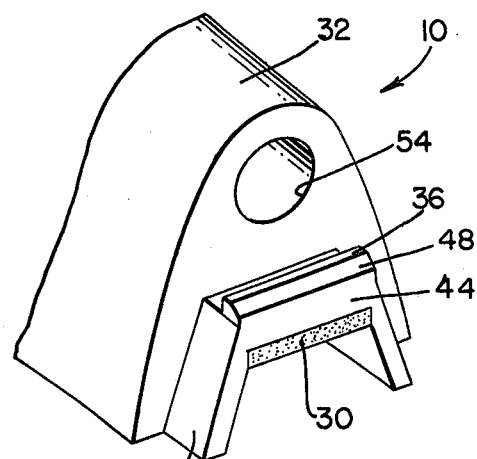
FIG. 5 is a fragmentary perspective view of one end of the clamping ring.
Figure 6:
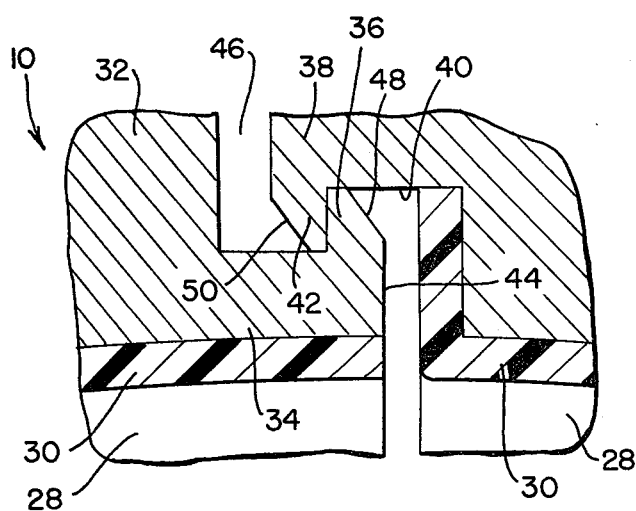
FIG. 6 is a greatly enlarged cross-sectional view of the latching portion of the clamping ring, similar to the view in FIG. 3.

Ring ends 32, 38 are provided with clearance holes 54, 56, respectively (as shown in FIGS. 3 and 5) to receive a clamping bolt (not illustrated) which will draw the ends together to establish the desired clamping pressure when threaded into steel nut 58 which may be molded in place.

In use, the clamping ring is resiliently spread apart a sufficient distance to permit it to clear flanges 16 and 18 of the pre-positioned ducts 12, 14. Ring ends 32 and 38 may then be manually pressed together to engage the latch. That is, as the ends 32 and 38 approach each other, chamfer 48 on latching lip 36 will engage chamfer 50 to cam lip 42 radially outwardly to permit lip 36 to pass behind lip 42 to establish the latch, as shown in FIG. 6. It will be noted that in the latched position, there is still clearance between seal-engaging face 44 of ring end 32 and the outwardly turned portion of seal 30 in recess 40 of ring end 38. The purpose of the latch and of this clearance is to enable the ducts to be rotated about their common axis after they are preliminarily positioned and retained by clamping ring 10, in the event that it is necessary to establish a predetermined angular relationship between one of the ducts and another connection to be made at the remote end of the illustrated ducts. Once that angular relationship has been established, clamping ring 10 may be tightened by means of a bolt inserted in holes 54, 56, to establish the desired clamping pressure. As shown in FIG. 6, clearance gap 46 is greater than the gap between engagement face 44 and seal 30, to assure that sufficient compression of the seal is established prior to a bottoming out condition which would result from premature elimination of gap 46. The particular dimensions are preferably selected so that with the latch engaged, but prior to tightening of the bolt, enough friction will be established between the two ends of the ducts to normally maintain a pre-selected position of the ducts, while permitting angular adjustment about their common axis, until the bolt is tightened. However, the frictional force is not so great as to cause damage to the seals during such adjustment.

As the clamping bolt is tightened, seal 30 will compress against the cylindrical outer rims of flanges 16, 18, thereby establishing a seal across the gap between the flanges. Another line of sealing contact is established along the engaging conical surfaces of legs 28 and flanges 16, 18. This engagement also serves to wedge the two flanges toward each other. The effectiveness of this action can be enhanced by forming the slope of the inner faces of legs 28 at an angle of approximately one-half degree closer to vertical than the slope of the conical faces on the duct flanges, thereby increasing the lateral wedging action.

The flexibilty and resilience of the disclosed plastic ring materials enables the legs 16, 18 to be continuous, without the relieving gap generally necessary to prevent tearing or buckling of metal rings. This feature permits continuous wedging and sealing pressure around the full flange perimeter.

Figure 7:
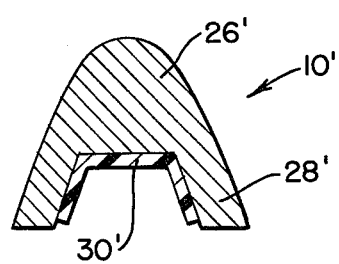
FIG. 7 is a cross-sectional view of the clamping ring of a modified form of the present invention.

A modified embodiment of the present invention is illustrated in FIG. 7, wherein like parts are identified with prime notations on the reference numerals. Comparing FIG. 7 with FIG. 2, it will be seen that seal 30' is formed with depending legs positioned to engage the conical surfaces of the abutting ducts. Thus, like seal 30 of the embodiment of FIGS. 1–6, tightening of the clamping ring will tighten the seal against the cylindrical outer rim of flanges 16 and 18, but the seal 30' of the FIG. 7 embodiment will additionally engage and seal against the conical surfaces of the flanges.

This invention may be further developed within the scope of the following claims. Accordingly, the above specification is to be interpreted as illustrative of only two operative embodiments of the present invention, rather than in a strictly limited sense.

We now claim:

1. In a system for removably clamping and sealing together the ends of a pair of connecting ducts of circular cross-section wherein each duct end is provided with a peripheral flange which is engageable by a clamping ring adapted to surround the flanges of the ducts to be joined, the ring being shaped and dimensioned to engage the flanges and force them together upon tightening of the clamping ring, the ring being formed with a short circumferential opening to enable it to be resiliently spread apart for assembly over the duct flanges and provided with adjustable securing means to draw together the two ends of the ring at the ring opening to tighten the ring upon the duct flanges to thereby clamp and seal the joint between the pair of ducts, the improved clamping ring which comprises:

a first end of the ring having an undercut recess to receive an integral non-adjustable projection on the second end of the ring, said recess and projection being shaped and positioned so that said projection can be inserted into said recess only by the temporary resilient relative displacement of the first and second ends of the ring in a radial direction, release of the displacement force permitting said first and second ends to return to a position wherein said recess and projection cooperate to form a temporary latch which holds the ends of the ring in a predetermined relative position and prevents the ends from separating in a circumferential direction;

said predetermined position being selected to provide sufficient clamping force to retain the connected ducts in an unclamped but loosely connected condition while permitting the ducts to be rotated about their common axis for final position adjustment prior to application of full clamping force by the adjustable securing means;

adjustable securing means on said clamping ring adapted to draw the two ends of the ring together after said projection and recess have established said temporary latch, to thereby tighten and clamp the ring onto the duct flanges and tightly draw the connecting ducts together.

2. The clamping and sealing system of claim 1 which further comprises a seal formed of relatively resilient compressible material secured to the entire inner circumference of the ring, a terminal portion of said seal at one end of the ring turning radially outwardly to a position where it is engaged and compressed by the other end of the ring when the ring ends are drawn together by the securing means to thereby uninterruptingly engage the full periphery of the duct flanges.

3. The clamping and sealing system of claim 1 wherein the clamping ring has a cross-section of generally V-shaped configuration defining a pair of radially inwardly diverging legs joined at their radially outer ends by a generally cylindrically-shaped base, the clamping ring being shaped and dimensioned so that the legs engage conical surfaces on said duct flanges which slope radially outwardly toward the duct ends, so that tightening of the clamping ring by said adjustable securing means wedges the duct ends toward end other, said legs of the clamping ring being continuous except for the short circumferential opening in the ring.

4. The clamping and sealing system of claim 3 which further comprises a seal formed of relatively resilient compressible material secured to the entire inner circumference of the ring and positioned to uninterruptingly engage the full periphery of the duct flanges to seal the duct joint when the clamping ring ends are drawn together by the securing means.

* * * * *